United States Patent Office 3,366,423
Patented Jan. 30, 1968

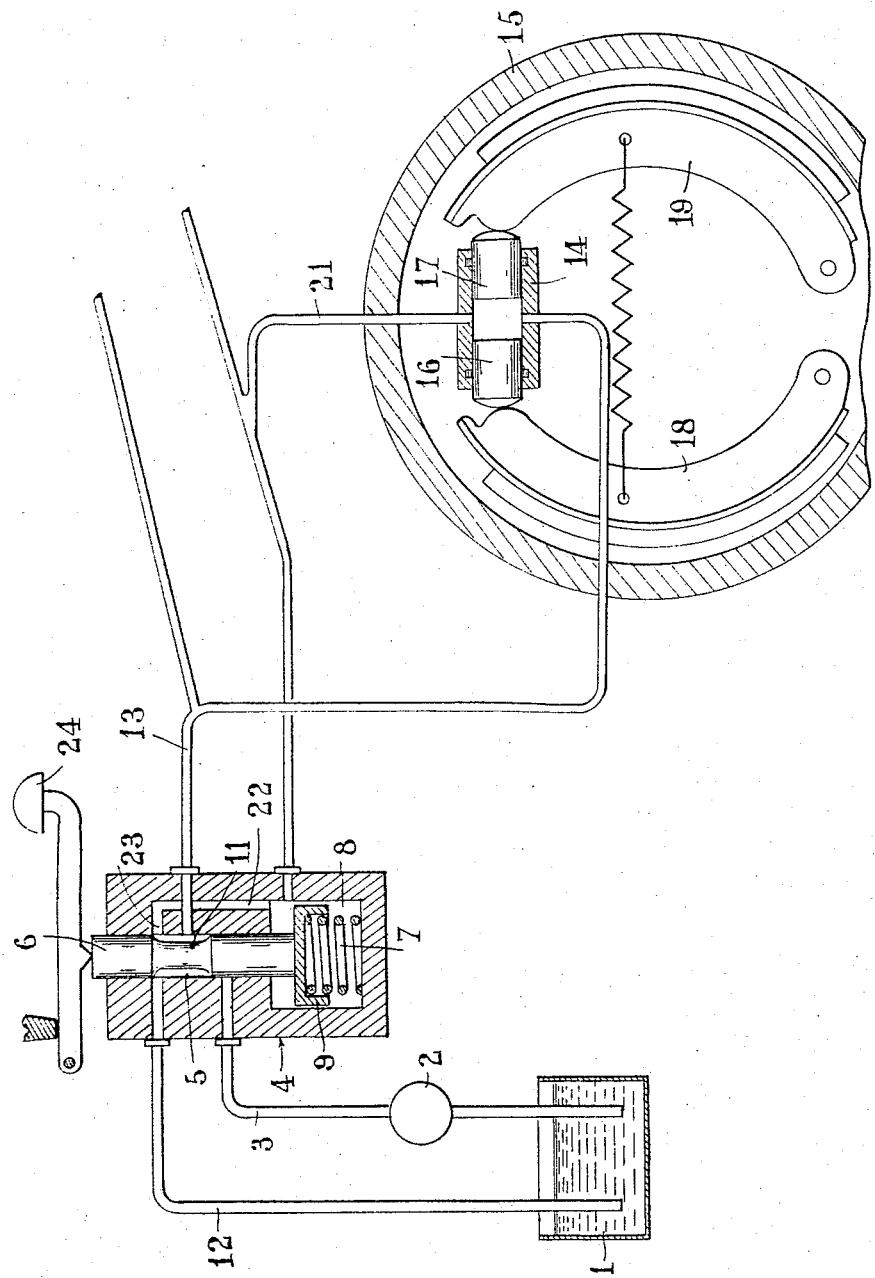

3,366,423
HYDRAULIC CONTROL DEVICES FOR BRAKING SYSTEMS OF VEHICLES
Edmond Henry-Biabaud, Paris, France, assignor to Société Anonyme Andre Citroen, Paris, France
Filed July 19, 1965, Ser. No. 472,833
Claims priority, application France, July 27, 1964, 983,135, Patent 1,413,132
3 Claims. (Cl. 303—50)

ABSTRACT OF THE DISCLOSURE

A hydraulic control device for vehicle brake, comprising a distributor having a slide valve adapted to counteract the action of the brake control pedal with a resistance proportional to the momentary pressure of the hydraulic fluid in the brake control cylinder, the shank of said slide valve projecting into a reaction chamber formed in the distributor and constantly connected through a special reaction line to the hydraulic fluid contained in the cylinder.

---

The present invention relates to improvements in or relating to hydraulic control devices of braking systems of vehicles.

All distributors or control valves of servo-action braking systems, whether of the pneumatic or hydraulic type, are based on the principle consisting in obtaining in the brake pipe line a pressure proportional to the braking effort exerted by the driver on the brake control member, for example the brake pedal.

During the braking period, that is, when the brake shoes actually engage the brake drum, no fluid is flowing and it may be said that the pressure prevailing in the distributor, which is exerted against the braking effort exerted by the driver, is effectively identical to that prevailing in the brake cylinders. However, the same does not apply to the initial phase of the action exerted by the driver on the brake pedal during the time period corresponding to the filling of the brake cylinder for moving the brake shoes towards the brake drums, for the pressure built up in the distributor is that required for obtaining the filling of said cylinders within a given time period. In other words, if it is desired to produce the braking action rather rapidly, a relatively considerable effort must be exerted on the distributor for producing a rapid filling, whereafter this effort must be released if it is desired to apply the brakes only slightly or moderately. Therefore, the lower the braking effort, the greater the time-lag obtaining during the initial phase of the braking action.

It is the scope of the present invention to improve the operation of servo-action braking devices of the above-mentioned type, notably in the case of trucks or like heavy vehicles having relatively large brake cylinders.

To this end, the hydraulic device for controlling the braking system of a vehicle, which comprises a source of fluid under pressure adapted to feed at least one brake cylinder through a slide-valve distributor actuated by the driver of the vehicle, the slide valve member of this distributor co-acting with a piston housed with ample clearance in a chamber of the distributor body which constitutes with said piston a device for damping out the slide-valve vibrations, is characterized in that the brake cylinder is connected through an auxiliary pipe line to the chamber in said distributor in which said damping piston is housed.

According to a complementary feature of this invention, the pipe line connecting the chamber of said distributor to the brake cylinder is connected to said cylinder in lieu of the bleeder plugs usually provided for eliminating air from the system.

The hydraulic control device according to this invention is advantageous in that, when the brake pedal is actuated, the distributor slide valve is kept in its fully open position, whether the effort exerted on the brake pedal is moderate or strong, so that the brake cylinder is filled at the maximum rate, irrespective of the desired force of the brake applications to be effected. Then the maximum braking pressure is only subordinate to the effort exerted on the brake pedal.

In order to afford a clearer understanding of this invention a specific form of embodiment thereof will now be described with reference to the attached drawing of which the single figure shows diagrammatically a hydraulic control device for the braking system of a vehicle which is constructed according to the teachings of this invention.

In the drawing, the hydraulic braking system illustrated comprises a fluid reservoir 1 and a pump 2 drawing the fluid from said reservoir 1 and delivering it under pressure into a feed pipe line 3 connected to a hydraulic distributor 4. The inlet pipe line 3 opens into a central bore 5 formed in the body of the distributor 4 and a movable valve member 6 is slidably mounted in this bore. This slide valve 6 is urged to its inoperative position as shown in the figure by a coil spring 7 reacting on the one hand against the bottom of a chamber 8 formed in the lower portion of the distributor body 4 and on the other hand against a piston 9 housed with ample clearance in said chamber and urged against the registering end of slide valve 6.

This slide valve 6 is provided along part of its intermediate portion with a peripheral annular groove 11 adapted in the inoperative position of said slide valve 6 to interconnect the exhaust or return line 12 leading from the reservoir to another pipe line 13 connecting in turn the distributor 4 with a brake cylinder 14. This brake cylinder 14 is mounted in the conventional manner within a brake drum 15 and its pistons 16 and 17 control respectively the pivotal movements of the brake shoes 18 and 19.

The drawing shows only one brake drum 15 and its shoes 18, 19, with the relevant control cylinder, but it is obvious that the distributor 4 is adapted to feed simultaneously a plurality of braking devices of same character.

According to this invention, an auxiliary pipe line 21 leading into the chamber 8 of the distributor body 4 is connected to the working chamber of the brake cylinder 14. This auxiliary pipe line 21 is attached in lieu of the bleeder plugs usually provided for eliminating air from the braking system. On the other hand, the chamber 8 communicates through a longitudinal duct 22 and a radial duct 23 with the bore 5 in which the distributor slide valve 6 is mounted.

In the inoperative position the groove 11 of slide valve 6 connects on the one hand the pipe line 13 leading to the brake cylinder and, on the other hand, the pipe line 23 connected to said auxiliary pipe line 21 to the exhaust or return line 12.

The braking effort exerted by the driver may be applied either directly to the slide valve 6 or through a brake pedal 24 as illustrated in the drawing. In the inoperative position the orifice of the pressure-fluid feed line 3 is closed by the slide valve 6 and the brake cylinder 14 receives zero pressure since it communicates with the reservoir 1 through the pipe lines 13, 21, 22, 23 and 12.

When the driver actuates the brake pedal 24 the slide valve 6 firstly closes the orifices of pipe lines 12 and 23, then opens the orifice of feed line 3 by means of its groove 11. The fluid under pressure will then flow through the pipe line 13 to the brake cylinder 14 in which the pressure rises in order to overcome the force of the return springs associated with the brake shoes 18 and 19. However, this pressure remains relatively low as long as the shoes are clear of the brake drum 15 and is transmitted through the auxiliary pipe line 21 to the chamber 8 in which it applies to the slide valve 6 an upwardly directed force as seen in the figure.

It may be noted that during this first phase of the operation of the device the slide valve 6 keeps the inlet port of the feed line 3 fully open, irrespective of the force with which the brake pedal 24 is exerted. Therefore, the brake cylinder 14 is filled at the maximum rate, irrespective of the desired braking force applied to the wheels.

When the shoes 18 and 19 engage the brake drum 15, the pressure rises rapidly in the brake cylinder 14 and is transmitted through the auxiliary pipe line 21 to the chamber 8, under the piston 9 and slide valve 6. As a result, the slide valve is moved upwards to shut off the orifice of the pipe line 3 delivering the fluid under pressure. The maximum braking pressure is thus limited by the effort exerted on the brake pedal 24.

At the end of the brake application, when the brake pedal 24 is released, the slide valve 6, urged upwards on the one hand by the pressure prevailing in the brake cylinder 14 and on the other hand by the force of the return spring 7, communicates the pressure of brake cylinder 14 to the fluid reservoir 1 through the pipe line 13 and also through the auxiliary pipe line 21 and ducts 22 and 23.

Since the auxiliary pipe line 21 is connected to the upper portion of brake cylinder 14 in lieu of the conventional bleeder plug, the cylinder is bleeded automatically upon each brake application to remove any traces of air or even of gas likely to develop therein as a consequence of abnormal overheating.

This invention is also applicable to a hydraulic braking system comprising a distributor device incorporating two slide valves of the type shown at 6, these slide valves being controlled by a compensator lever according to the known arrangement.

On the other hand, the above-described arrangement is applicable as well to any other known type of hydraulic braking systems, notably to disc brakes.

What I claim is:

1. A hydraulic brake control device comprising a reservoir and a source of compressed hydraulic fluid, a distributor through which an axial passage is formed which opens at its upper end to the outside of the distributor and at its lower end into a reaction chamber, a compression return spring housed in said reaction chamber, a slide valve slidably mounted in said axial passage and having a control head projecting from said distributor and a shank protruding in said reaction chamber and engaging a damping piston bearing on said return spring, a feed line and a return line connecting said source of compressed fluid and said reservoir respectively to two spaced ports leading into said axial passage, a hydraulic brake control cylinder, a hydraulic brake control line connecting one point of said brake cylinder to a third port of said axial passage which lies between said spaced ports, and a reaction duct connecting said reaction chamber to a second port of said brake cylinder.

2. Device as set forth in claim 1, which comprises a duct connecting said piston chamber to said bore, the orifice of said duct in said bore lying in the same transverse plane, in relation to the direction of motion of said slide valve, as the orifice of said exhaust pipe line.

3. Device as set forth in claim 1, wherein said reaction pipe line is connected to the upper portion of the brake cylinder in lieu of the conventional bleeder plug.

References Cited

UNITED STATES PATENTS

| | | | |
|---|---|---|---|
| 1,454,525 | 5/1923 | Thompson | 303—54 |
| 2,597,598 | 5/1952 | Robison | 303—54 |
| 2,929,660 | 3/1960 | Brueder | 303—22 |

EUGENE G. BOTZ, *Primary Examiner.*